(12) United States Patent
Matsuura et al.

(10) Patent No.: US 9,033,705 B2
(45) Date of Patent: May 19, 2015

(54) HEATING FURNACE AND HEATING METHOD EMPLOYED BY HEATING FURNACE

(75) Inventors: Masanari Matsuura, Chiryu (JP); Sotaro Oi, Saitama (JP); Tomoyuki Kubota, Yatsushiro (JP); Masaya Tsuruta, Kumamoto (JP)

(73) Assignees: TOYOTA JIDOSHA KABUSHIKI KAISHA, Toyota (JP); HIRATA CORPORATION, Tokyo (JP)

( * ) Notice: Subject to any disclaimer, the term of this patent is extended or adjusted under 35 U.S.C. 154(b) by 1378 days.

(21) Appl. No.: 12/448,356

(22) PCT Filed: Aug. 6, 2008

(86) PCT No.: PCT/JP2008/064083
§ 371 (c)(1),
(2), (4) Date: Jun. 18, 2009

(87) PCT Pub. No.: WO2009/022590
PCT Pub. Date: Feb. 19, 2009

(65) Prior Publication Data
US 2009/0325116 A1 Dec. 31, 2009

(30) Foreign Application Priority Data
Aug. 10, 2007 (JP) .................................. 2007-208785

(51) Int. Cl.
*F27B 5/18* (2006.01)
*F27B 5/16* (2006.01)
(Continued)

(52) U.S. Cl.
CPC .............. *B23K 1/0016* (2013.01); *B23K 1/008* (2013.01); *B23K 2201/40* (2013.01); *F27B 5/04* (2013.01);
(Continued)

(58) Field of Classification Search
CPC ................ F27B 5/16; F27B 5/18; F27B 5/04; F27B 5/14; B23K 1/0016; B23K 1/008; B23K 2201/40; F27D 19/00; F27D 7/06
USPC ............. 432/198, 205; 110/185; 373/77, 100, 373/140; 75/10.64; 65/29.15; 422/119
See application file for complete search history.

(56) References Cited

U.S. PATENT DOCUMENTS 5,429,498 A * 7/1995 Okase et al. ................... 432/152
5,525,160 A * 6/1996 Tanaka et al. ................. 118/728
(Continued)

FOREIGN PATENT DOCUMENTS

JP U-62-130394 8/1987
JP U-64-54972 4/1989
(Continued)

OTHER PUBLICATIONS

Feb. 6, 2012 Office Action issued in German Patent Application No. 11 2008 000 561.3-24 (with translation).

*Primary Examiner* — Gregory Huson
*Assistant Examiner* — John Bargero
(74) *Attorney, Agent, or Firm* — Oliff PLC (57) ABSTRACT

A hydrogen vacuum furnace (100) is provided with a process chamber (1) wherein a subject (10) to be heated is stored; a heating chamber (2) wherein a heater lamp (25) is stored; and a crystal board (3) for separating the subject (10) and the heater lamp (25) one from the other. In the hydrogen vacuum furnace (100), the subject (10) is heated by a radiant ray applied from the heater lamp (25). The process chamber (1) and the heating chamber (2) are provided with gas feed ports (11, 21) and exhaust ports (12, 22), respectively, for feeding and exhausting a gas. When the subject (10) is being heated, atmospheric pressure in each chamber is adjusted so that the heating chamber (2) is under positive pressure to the process chamber (1) by feeding or exhausting the gas.

12 Claims, 5 Drawing Sheets (51) Int. Cl.
*B23K 1/00* (2006.01)
*B23K 1/008* (2006.01)
*F27B 5/04* (2006.01)
*F27B 5/14* (2006.01)
*F27D 7/06* (2006.01)
*F27D 19/00* (2006.01)

(52) U.S. Cl.
CPC ... *F27B 5/14* (2013.01); *F27B 5/16* (2013.01); *F27B 5/18* (2013.01); *F27D 7/06* (2013.01); *F27D 19/00* (2013.01)

(56) References Cited

U.S. PATENT DOCUMENTS

| | | | |
|---|---|---|---|
| 5,777,241 A * | 7/1998 | Evenson | 73/863.11 |
| 5,976,260 A * | 11/1999 | Kinoshita et al. | 118/719 |
| 6,331,212 B1 * | 12/2001 | Mezey, Sr. | 118/725 |
| 6,769,908 B2 * | 8/2004 | Kawase | 432/77 |
| 7,756,403 B2 * | 7/2010 | Seki et al. | 392/407 |
| 2002/0034714 A1 | 3/2002 | Deguchi et al. | |

FOREIGN PATENT DOCUMENTS

| | | |
|---|---|---|
| JP | A-5-211391 | 8/1993 |
| JP | A-7-238380 | 9/1995 |
| JP | A-2002-327217 | 11/2002 |
| JP | A-2004-134631 | 4/2004 |
| JP | A-2005-205418 | 8/2005 |
| JP | A-2005-271059 | 10/2005 |
| JP | A-2005-311270 | 11/2005 |

* cited by examiner

HEATING FURNACE AND HEATING METHOD EMPLOYED BY HEATING FURNACE

TECHNICAL FIELD

The present invention relates to a heating furnace for heating a subject to be heated by radiation and a heating method employed by the heating furnace. More particularly, the present invention relates to a heating furnace capable of avoiding ignition and enhancing safety and a heating method employed by the heating furnace.

BACKGROUND ART

Heretofore, in a soldering process for bonding a semiconductor element or device to be used in a power module such as an IGBT (insulated gate bipolar transistor) element and others to a substrate through a solder, a hydrogen atmosphere is formed in a chamber serving as a process chamber and the process is conducted under reduced pressure of the atmosphere (for example, Patent Literature 1).

Figure 5:
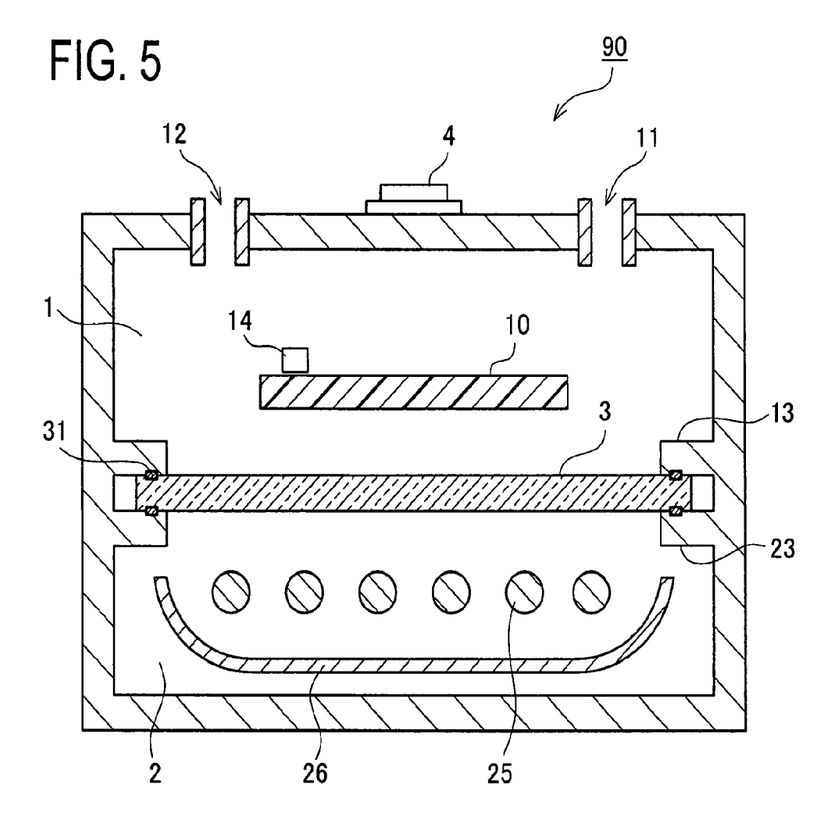
FIG. 5 is a configuration view of a hydrogen vacuum furnace in a prior art.

A typical hydrogen vacuum furnace has such a configuration as shown in FIG. 5. Specifically, a hydrogen vacuum heating furnace 90 includes a process chamber 1 in which a subject 10 to be heated ("subject") will be placed or set, a heating chamber 2 in which heater lamps 25 serving as a heating source are housed, and a crystal board 3 for separating the process chamber 1 and the heating chamber 2. The process chamber 1 is provided with a feed port 11 for feeding hydrogen or a mixture gas of hydrogen and inert gas and an exhaust port 12 for discharging gas from the process chamber 1. In the hydrogen vacuum furnace 90, the subject 10 is heated by a radiant ray (an infrared ray or the like) from the heater lamp 25.

The hydrogen vacuum furnace having the above configuration that separates the heater lamps from the subject to be heated provides the following merits as compared with a configuration in which a heater lamp is placed in a process chamber:

(1) The heater lamp which becomes an ignition source is separated from hydrogen or a mixture gas of hydrogen and inert gas;
(2) The heater lamp is prevented from electrically discharging during heating under reduced pressure;
(3) The heater lamp can be replaced with another one without contaminating the inside of the process chamber (Easy maintenance);
(4) The volume of the process chamber is reduced (Reduced amount of gas to be used);
(5) Impurities (flux contained in solder or the like) are prevented from sticking to the heater lamp;
(6) The process chamber is prevented from contamination by impurities (a reflection film coated on the surface of the heater lamp or the like) from the heater lamp.

Patent Literature 1: JP2005-205418A

SUMMARY OF INVENTION

Technical Problem

However, the aforementioned conventional hydrogen vacuum furnace 90 has the following disadvantages. Specifically, the crystal board 3 is sealed by sealing members 31 such as O-rings which tend to deteriorate with duration. This deterioration may break the sealing members 31, resulting in insufficient sealing. Breakage of the sealing members 31 will cause hydrogen or a mixed gas of hydrogen and inert gas to rapidly flow from the process chamber 1 into the surrounding of each heater lamp 25, which may become an ignition source.

The present invention has been made to solve the above problems of the aforementioned conventional heating furnace. Specifically, the present invention has a purpose to provide a heating furnace capable of avoiding ignition and enhancing the safety and a heating method employed by the heating furnace.

Solution to Problem

To achieve the above purpose, there is provided a heating furnace for heating a subject to be heated by radiation, comprising: a first chamber in which the subject will be placed, the first chamber including a gas feed port and a gas exhaust port; a second chamber placed adjacent to the first chamber and housing a heating source, and including a gas feed port and a gas exhaust port; and a separation member for separating the first chamber and the second chamber and allowing a radiant ray from the heating source to pass through, wherein atmosphere and atmospheric pressure in the first chamber and the second chamber are changed by feeding gas into and out of the first chamber and the second chamber through the feed ports and the exhaust ports.

In the heating furnace of the present invention, the first and second chambers are placed adjacently, and the radiant ray from the heating source in the second chamber is allowed to pass through the separation member separating both the chambers and be absorbed by the subject to be heated, thereby heating the subject. Each of the first and second chambers is provided with the gas feed port and the gas exhaust port for allowing gas feeding and exhausting. In other words, the chambers can be evacuated to create a vacuum or supplied with gas to perform atmosphere replacement and adjustment of atmospheric pressure.

Accordingly, for example, before the heating process of the subject to be heated, both the chambers are evacuated to remove oxygen from the chambers. The atmosphere of the second chamber is thus replaced with nitrogen. In this way, the second chamber is brought into the inert gas atmosphere and the oxygen concentration which is one of hydrogen ignition conditions is reduced, thereby avoiding firing.

In the heating furnace of the present invention, preferably, during a heating process of the subject, the atmospheric pressure in the second chamber is higher than the atmospheric pressure in the first chamber. Specifically, the inert gas (e.g., nitrogen) is fed into the second chamber. This brings the second chamber into a higher atmospheric pressure state than the first chamber. Even if a sealing member which seals a gap between the first and second chambers is broken, it is possible to prevent hydrogen in the first chamber from rapidly flowing in the second chamber during the heating process. This makes it possible to prevent the hydrogen and an ignition source from simultaneously exist in the second chamber and hence avoid firing.

Furthermore, in the heating furnace of the present invention, preferably, during the heating process of the subject, a flow of inert gas going from the feed port of the second chamber toward the exhaust port of the second chamber is formed. Specifically, the inert gas blowing process is performed in the second chamber. This blowing process can prevent a rise in atmospheric temperature of the second chamber. In association with this, the temperature rise of the separation member is also prevented. Since a highest temperature area in the first chamber is the separation member, the temperature rise in the first chamber is also prevented, which can prevent the appearance of an ignition source (410° C. or higher) which is one of ignition conditions, thus avoiding ignition in the first chamber.

Furthermore, preferably, the heating furnace of the present invention comprises a gas sensing section for detecting a first gas to be fed into the first chamber, the gas sensing section being located in the second chamber or in an exhaust path of gas to be discharged from the second chamber, wherein when the gas sensing section detects that the first gas is at a predetermined value or higher, safety control is performed to prevent content of the first gas in the second chamber from increasing.

Specifically, the gas sensing section detects the first gas (e.g., hydrogen) contained in the second chamber. When the predetermined value or higher is detected, the safety control is performed to prevent the content of the first gas in the second chamber from increasing. For example, the safety control may be performed by stopping feeding of the first gas into the first chamber. Alternatively, the safety control may be performed by increasing a flow velocity of inert gas to be fed into the second chamber. This makes it possible to prevent the concentration of the first gas in the second chamber from increasing and hence to avoid firing.

Furthermore, preferably, the heating furnace of the present invention, comprises: a first pressure gauge for detecting atmospheric pressure in the first chamber; a second pressure gauge for detecting atmospheric pressure in the second chamber; and a control section for controlling the atmospheric pressure in the first chamber and the atmospheric pressure in the second chamber based on measurement results of the first pressure gauge and the second pressure gauge, wherein the control section controls that, during the heating processing of the subject, the atmospheric pressure in the second chamber is higher than the atmospheric pressure in the first chamber and a pressure difference between the atmospheric pressure in the first chamber and the atmospheric pressure in the second chamber is a predetermined value or lower.

Specifically, the control section maintains a state where the pressure difference between the first and second chambers is small. Thus, the stress load on the separation member can be reduced and a reduction in the thickness of the separation member can be achieved. Accordingly, the distance between the heating source and the subject to be heated is shortened, thereby enhancing a heating efficiency. In addition, a cost reduction of the separation member itself can be achieved. Since absorbed energy by the separation member decreases, the temperature of the separation member 3 is prevented from rising.

According to another aspect, the present invention provides a heating method employed by a heating furnace for heating a subject to be heated by radiation, the heating furnace comprising a first chamber for accommodating the subject to be heated, a second chamber placed adjacent to the first chamber and housing a heating source, and a separation member for separating the first chamber and the second chamber and allowing a radiant ray from the heating source to pass through, the method comprising: a preparation step before delivering the subject to be heated into the first chamber, the preparation step including replacing inside of the second chamber with an inert gas atmosphere and then increasing atmospheric pressure in the second chamber than outside atmospheric pressure; an evacuation step after delivering the subject to be heated into the first chamber, the evacuation step including evacuating the first chamber to reduce the atmosphere thereof to a predetermined pressure; and a heating step after the first chamber is evacuated, the heating step including heating the subject to a predetermined temperature.

The aforementioned heating method employed by the heating furnace, preferably, comprises a blowing control step of keeping the second chamber at a predetermined atmospheric pressure and forming a flow of inert gas going from a feed port of the second chamber toward an exhaust port of the second chamber.

The aforementioned heating method employed by the heating furnace, preferably, comprises a pressure difference control step of controlling the atmospheric pressure in each of the first chamber and the second chamber in sync with variations in atmospheric pressure in the first chamber so that the atmospheric pressure in the second chamber is higher than the atmospheric pressure in the first chamber and a pressure difference between the atmospheric pressure in the first chamber and the atmospheric pressure in the second chamber is a predetermined value or lower.

The present invention can provide the heating furnace capable of avoiding ignition and enhancing safety and the heating method employed by the heating furnace.

DESCRIPTION OF EMBODIMENTS

A detailed description of a preferred embodiment of a heating furnace embodying the present invention will now be given referring to the accompanying drawings. In this embodiment, the present invention is applied to a hydrogen vacuum furnace to be used in a process for soldering an IGBT element to a ceramic substrate.

<Configuration of Hydrogen Vacuum Furnace>

Figure 1:
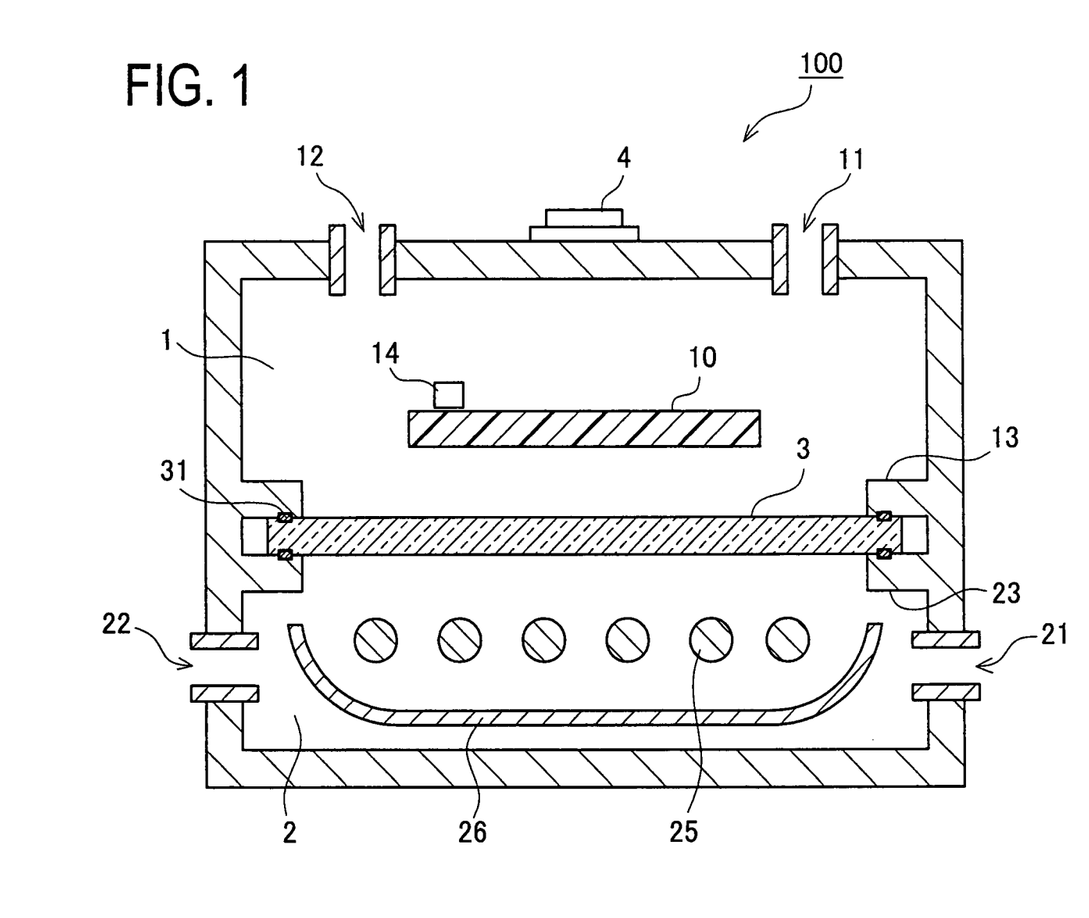
FIG. 1 is a configuration view of a hydrogen vacuum furnace of a preferred embodiment.

A heating vacuum furnace 100 of this embodiment includes, as shown in FIG. 1, a process chamber 1 in which a subject 10 to be heated (simply, a "subject") will be placed or set for a soldering process of the subject 10, a heating chamber 2 in which heater lamps 25 serving as a heating source are arranged, a crystal board 3 which separates the subject 10 and the heater lamps 25 from each other, and a safety valve 4 which is to be opened when the inner pressure of the process chamber 1 reaches a predetermined atmospheric pressure or higher. In the hydrogen vacuum furnace 100, the subject 10 is heated with radiant rays emitted from the heater lamps 25.

The subject 10 is constituted of an IGBT element, a ceramic substrate, and a solder pellet bonding the IGBT element to the ceramic substrate. The IGBT element is made by a well known semiconductor manufacturing technique. The solder is Pb-free solder that does not substantially containing lead (in this embodiment, Sn—In, Sn—Cu—Ni, Sn—Cu—Ni—P, Sn—Ag—Cu, etc.). The subject 10 is held at its end by a holder member not shown.

The process chamber 1 is provided with a feed port 11 for supplying hydrogen or a mixture gas of hydrogen and inert gas (nitrogen in this embodiment) to the process chamber 1, an exhaust port 12 for discharging gas from the process chamber 1, and a thermometer 14 for measuring the temperature of the subject 10.

The heating chamber 2 is provided with a feed port 21 for feeding inert gas (nitrogen in this embodiment) into the heating chamber 2, an exhaust port 22 for discharging gas from the heating chamber 2, heater lamps 25 (halogen lamps in this embodiment) which emit radiant rays (infrared rays in this embodiment) in a predetermined wavelength range, and a reflection plate 26 having a paraboloidal surface which reflects the radiant rays emitted from the heater lamps 25. The reflection plate 26 is placed in such a position as to reflect the radiant rays from the heater lamps 25 toward the process chamber 1.

The crystal board 3 is a crystal glass plate of 400 mm in length, 400 mm in width, and 10 mm in thickness, located between the process chamber 1 and the heating chamber 2 to partition them. The crystal board 3 has a function of allowing the radiant rays emitted from the heater lamps 25 to pass through. An edge portion of the crystal board 3 is held between retaining parts 13 and 23 formed on wall surfaces of the process chamber 1 and the heating chamber 2. O-rings 31 are placed to seal gaps between the retaining pars 13 and 23 and the crystal board 3, thereby ensuring gas-tightness between the process chamber 1 and the heating chamber 2.

<Configuration of Heating Control System>

Figure 2:
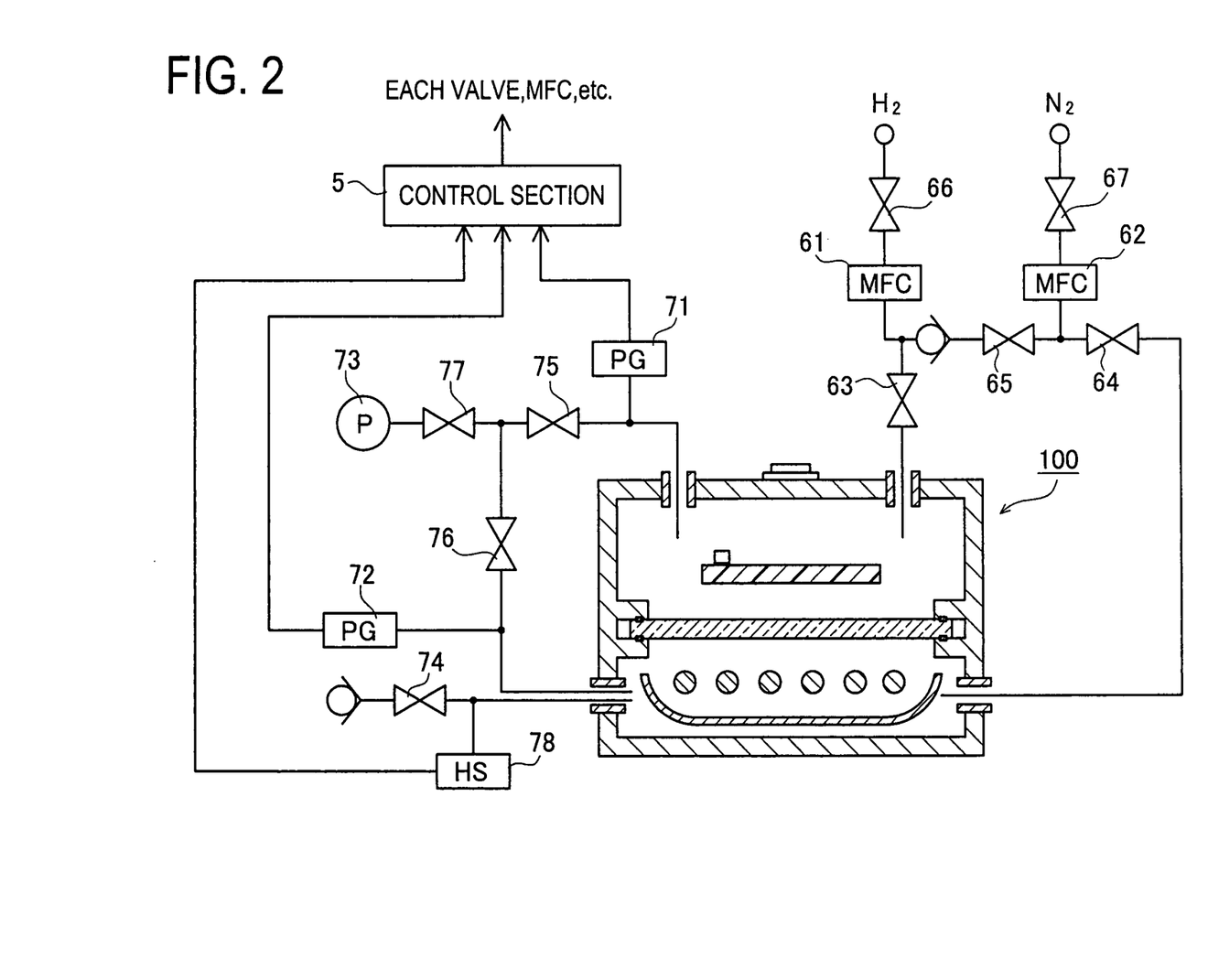
FIG. 2 is a configuration view of a heating control system included in the hydrogen vacuum furnace of FIG. 1.

A heating control system including the hydrogen vacuum furnace 100 of this embodiment includes, as shown in FIG. 2, mass flow controllers (MFC) 61 and 62, various valves 63, 64, 65, 66, 67, 74, 75, 76, 77, pressure gauges (PG) 71 and 72, a pump (P) 73, and a control section 5 for controlling operation of each device.

To be concrete, the process chamber 1 is fed with hydrogen ($H_2$) gas. A hydrogen feed system includes the valve 66, the MFC 61, and the valve 63 arranged in this order in a hydrogen feeding direction to feed hydrogen gas into the process chamber 1 through the feed port 11 thereof. The heating chamber 2 is supplied with nitrogen ($N_2$) gas. A nitrogen feed system includes the valve 67, the MFC 62, and the valve 64 arranged in this order in a nitrogen feeding direction to feed nitrogen gas into the heating chamber 2 through the feed port 21 thereof. Furthermore, a branch passage extends from between the MFC 62 and the valve 64 to communicate with the hydrogen feed system through the valve 65. In other words, in this system, nitrogen is allowed to be fed into the process chamber 1 according to the on-off operation of the valve 65. A feed amount of each gas is controlled by the MFCs 61 and 62.

Atmospheres in the process chamber 1 and the heating chamber 2 are sucked by the pump 73. Specifically, an exhaust system of the process chamber 1 includes the valves 75 and 77, and the pump 73 arranged in this order from the side of the exhaust port 12 of the process chamber 1. On the other hand, an exhaust system of the heating chamber 2 includes the valves 76 and 77, and the pump 73 arranged in this order from the side of the exhaust port 22 of the heating chamber 2. That is, the pump 73 and the valve 77 are used in common for exhaust of the process chamber 1 and the heating chamber 2. Furthermore, a leak valve 74 is placed downstream from the exhaust port 22 to carry out nitrogen blowing by the on-off operation of the valve 74.

In the exhaust system of the process chamber 1, the pressure gauge 71 is placed downstream from the exhaust port 12 of the process chamber 1. This measures atmospheric pressure in the process chamber 1. On the other hand, in the exhaust system of the heating chamber 2, the pressure gauge 72 is placed downstream from the exhaust port of 22 of the heating chamber 2. This measures atmospheric pressure in the heating chamber 2. Measurement results of the pressure gauges 71 and 72 are transmitted to the control section 5.

In the exhaust system of the heating chamber 2, a hydrogen sensor 78 is placed downstream from the exhaust port 22 of the heating chamber 2 to detect hydrogen concentration in the atmosphere in the heating chamber 2. A measurement result of the hydrogen sensor 78 is transmitted to the control section 5.

<Soldering Procedure>

The following explanation is given to operation procedures of the soldering process utilizing the heating control system of this embodiment. In the following explanation, two operation procedures are described by assuming a first mode as a basic example and a second mode as an application.

<First Mode>

Firstly, before delivery of the subject 10 as a workpiece, pre-operation preparation is conducted by nitrogen replacement of both the process chamber 1 and the heating chamber 2 (Step 1). Specifically, both chambers are evacuated by the pump 73. Then, both chambers are supplied with nitrogen to thereby purge oxygen from both chambers until the oxygen concentration is reduced to 10 ppm or lower. Thus, a nitrogen atmosphere is created in each chamber.

Subsequently, while the leak valve 74 is controlled to keep atmospheric pressure in the heating chamber 2 at 1.1 atm, nitrogen is fed at 20 liters/min. into the heating chamber 2 (Step 2). In the heating chamber 2, accordingly, nitrogen gas is caused to flow from the feed port 21 toward exhaust port 22, forming a gas flow (hereinafter, this process is referred to as "nitrogen blowing process"). In this step 2, the pre-operation preparation is finished, oxygen is removed from both chambers, and the atmospheric pressure in the heating chamber 2 becomes higher than outside atmospheric pressure.

Subsequently, the procedure goes to the soldering process where the following operations are conducted. The subject 10 is first delivered into the process chamber 1 (Step 3). The nitrogen atmosphere in the process chamber 1 is replaced with hydrogen (Step 4). In other words, the process chamber 1 is evacuated by the pump 73. Then, the process chamber 1 is supplied with hydrogen to create a hydrogen atmosphere in the process chamber 1.

Subsequently, the heater lamps 25 are tuned on to heat the subject 10 up to a preheating target temperature (200° C. in this embodiment) lower than a melting point of solder (solder solidus temperature of 235° C.). After that, the heater lamps 25 are turned off to keep the temperature for a predetermined time (Step 5). This preheating cleans up the surface of the subject 10.

For compressing bubbles in the solder or other purposes, the process chamber 1 is evacuated to 2 kPa (Step 6). This largely reduces the atmospheric pressure in the process chamber 1 than the atmospheric pressure in the heating chamber 2. Thereafter, the subject 10 is heated up to a final target temperature (280° C. in this embodiment) higher than the solder melting point (solder liquidus temperature of 240° C.) (Step 7). By this main heating, the solder melts, wet and spread to a predetermined area.

The heater lamps 25 are turned off, the inside of the process chamber 1 is replaced with nitrogen again so as to return to the outside atmospheric pressure (Step 8). Then, the subject 10 is cooled to near room temperature, solidifying the solder. The soldering process is thus completed. The subject 10 is then delivered out. In this way, in the soldering process (Steps 3 to 8), the atmospheric pressure in the heating chamber 2 is kept to be higher than the atmospheric pressure in the process chamber 1.

It is to be noted that, during the nitrogen blowing process, a flow rate of hydrogen is detected by the hydrogen sensor 78. In other words, it is detected whether or not the hydrogen fed into the process chamber 1 leaks in the heating chamber 2. If the hydrogen is detected to be a predetermined value or higher, safety control is performed to prevent a rise in the content of hydrogen in the heating chamber 2, thereby avoiding ignition even if a slight amount of hydrogen flows in the heating chamber 2.

The safety control is carried out for example by urgently stopping the heater lamps 25 to make the existence of the ignition source disappear or by increasing the flow rate of nitrogen in the nitrogen blowing process to purge hydrogen from the heating chamber 2. In other words, a condition where the hydrogen and the ignition source exist simultaneously is prevented from occurring.

In the soldering process of this embodiment explained above in detail, the pre-operation preparation is conducted by evacuating both chambers to remove oxygen from both chambers (Step 1), thereby replacing the atmosphere in both chambers with nitrogen. Therefore, particularly in the heating chamber 2, an inert gas atmosphere is created with reduced oxygen concentration, thus ensuring avoidance of ignition.

In this embodiment, furthermore, during the heating process of the subject 10, the atmospheric pressure in the heating chamber 2 is higher than the atmospheric pressure in the process chamber 1. Specifically, the atmospheric pressure in the heating chamber 2 is increased by feeding nitrogen into the heating chamber 2 (Step 2). In the process chamber 1, on the other hand, the heating process is conducted under reduced pressure (Step 6). Accordingly, during the heating process of the subject 10, the heating chamber 2 is under positive pressure with respect to the process chamber 1. Even if the sealing members 31 are broken, hydrogen in the process chamber 1 is prevented from rapidly flowing in the heating chamber 2. The hydrogen and the ignition source are therefore prevented from simultaneously exist in the heating chamber 2, thus avoiding ignition.

In this embodiment, during the heating process of the subject 10, the nitrogen blowing process is conducted (Step 2) to thereby prevent a rise in atmospheric pressure in the heating chamber 2. This also prevents a rise in temperature of the crystal board 3. A highest temperature area in the process chamber 1 is the surface of the crystal board 3 and thus the temperature rise in the process chamber 1 is also prevented, thereby preventing the appearance of the ignition source (410° C. or higher) which is one of ignition conditions, thus avoiding ignition.

In this embodiment, furthermore, oxygen in the heating chamber 2 is removed down to 10 ppm or lower. It is therefore possible to prevent deterioration of the heater lamps 25 by oxidation. In this embodiment, particularly, the halogen lamp is utilized and accordingly oxidation of the sealing members of the heater lamps 25 will largely influence the heater life. Thus, preventing oxidation is particularly effective in achieving a long life.

<Second Embodiment>

In this embodiment, a soldering process is conducted by controlling the atmospheric pressure in each chamber so that the atmospheric pressure in the heating chamber 2 follows variations in atmospheric pressure in the process chamber 1 and is constantly positive pressure with respect to the process chamber 1. This configuration is different from that in the first embodiment where close pressure control is not conducted.

Figure 3:
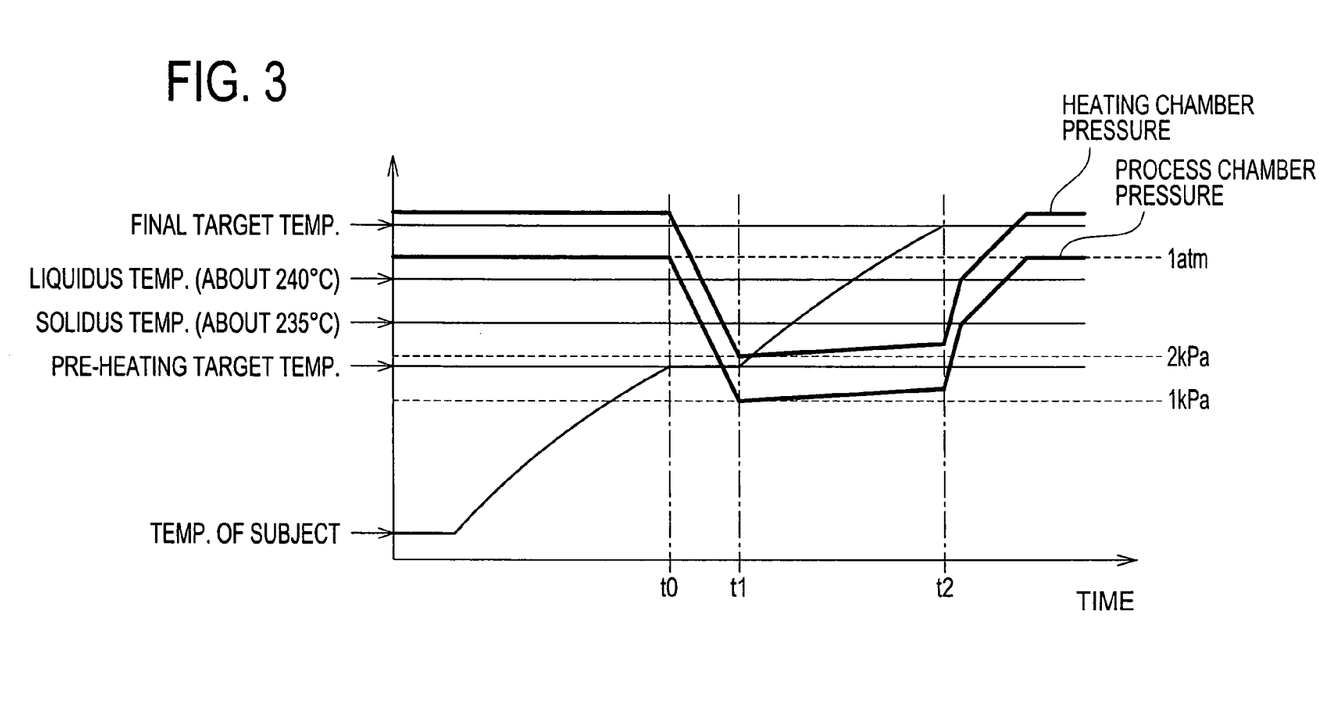
FIG. 3 is a graph showing profiles of temperature and pressure in a soldering process.

Operations in the soldering process in this embodiment will be explained below with reference to a graph in FIG. 3 showing profiles of temperature and pressure. The operation for pre-operation preparation is the same as in the first embodiment.

Firstly, from the time of delivery of the subject 10 to the time t0, pre-heating is performed by heating the subject 10 to the pre-heating target temperature. During this period, the inside of the heating chamber 2 is kept at a higher atmospheric pressure than in the process chamber 1. By the nitrogen blowing process, the atmosphere in the heating chamber 2 is refreshed at all times. This makes it possible to prevent the atmospheric temperature in the heating chamber 2 and the temperature of the crystal board 3 from rising.

Subsequently, from the time t0 to the time t1, the atmospheric pressure in the process chamber 1 is reduced to 1 kPa. At that time, in the heating chamber 2, the nitrogen blowing process is also stopped and the pressure is reduced to 2 kPa in sync with the vacuum timing to prevent a pressure difference between both chambers from exceeding 1 kPa. The pressure of each chamber is measured by the pressure gauge 71 or 72. Based on each measurement result, the control section 5 controls the pressure of each chamber. To be concrete, the pressure control during pressure rise is performed by the MFCs 61 and 62 and the pressure control during pressure drop is performed by on-off operations of the vacuum valves 75, 76, and 77.

Then, from the time t1 to the time t2, main heating is performed by heating the subject 10 to the final target temperature. During this period, the heating causes the temperature of the process chamber 1 to gradually rise. Accordingly, the process chamber 1 is evacuated as needed to perform fine control to prevent the pressure difference from the heating chamber 2 from exceeding 1 kPa.

After the time t2, the heater lamps 25 are turned off and nitrogen is fed into both chambers to return the inside of the process chamber 1 to outside atmospheric pressure. At this time, an amount of nitrogen to be supplied is controlled to prevent the pressure difference between the heating chamber 2 and the process chamber 1 from exceeding 1 kPa. The subject 10 is then cooled to near room temperature to solidify the solder. The soldering process is thus terminated. Thereafter, the subject 10 is carried out.

In the soldering process in this embodiment, the control section 5 performs pressure control to keep the pressure difference in atmospheric pressure between the process chamber 1 and the heating chamber 2 from exceeding 1 kPa. This makes it possible to reduce stress load on the crystal board 3, thereby achieving a reduction in the thickness of the crystal board 3. Specifically, in the first embodiment, the crystal board 3 needs to have a thickness of about 10 mm, whereas the crystal board 3 has only to have a reduced thickness of about 5 mm. Accordingly, the distance between each heater lamp 25 and the subject 10 is shortened, thereby enhancing a heating efficiency. Cost of the crystal board 3 itself can also be reduced. Since absorbed energy by the crystal board 3 decreases, the rise in temperature of the crystal board 3 is prevented.

Figure 4:
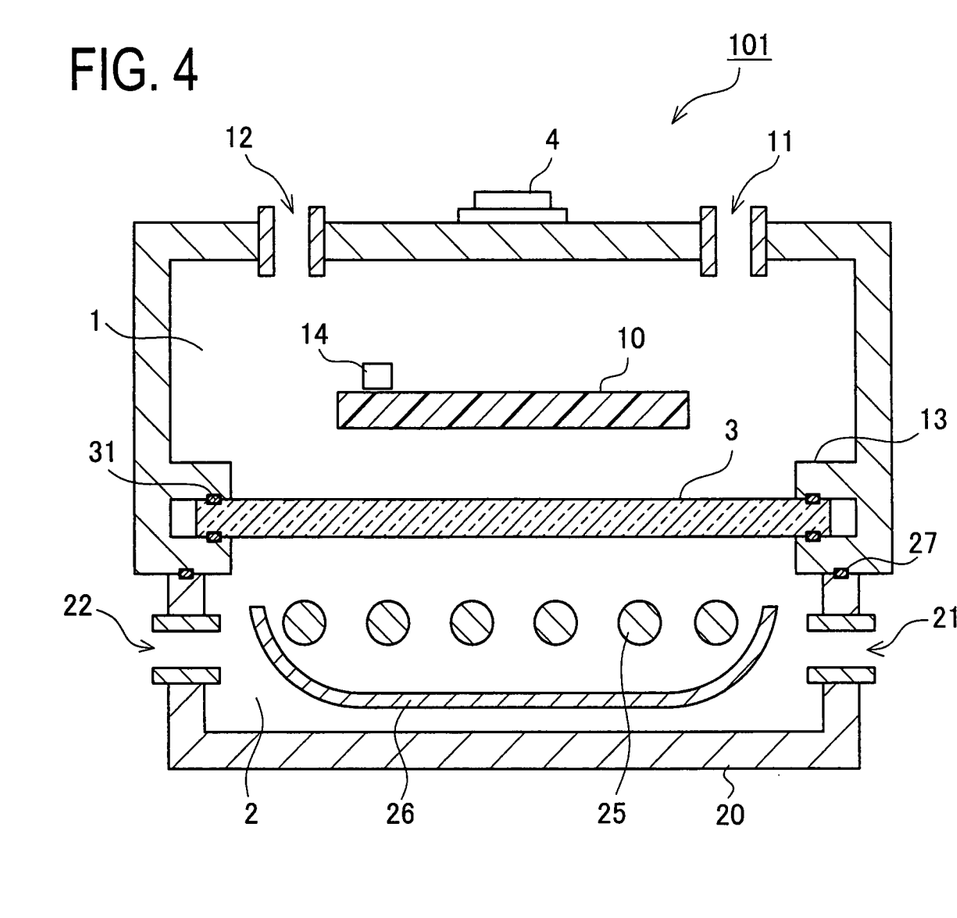
FIG. 4 is a configuration view of a heating vacuum furnace including a process chamber and a heating chamber separately provided.

The above embodiments are merely examples that do not give any limitations to the present invention. The present invention may be embodied in other specific forms without departing from the essential characteristics thereof. For instance, in the above embodiments, the process chamber 1 and the heating chamber 2 are configured as an integral chamber in which the crystal board 3 is placed to partition the inside thereof, but not limited thereto. For instance, as shown in FIG. 4, a heating box 20 which can be reduced in pressure may be attached to the process chamber 1. That is, the process chamber 1 and the heating chamber 2 may be configured separately.

Although the pressure gauges 71 and 72 and the hydrogen sensor 78 are placed outside the process chamber 1 and the heating chamber 2, they are not limited therein and may be placed inside the process chamber 1 or the heating chamber 2.

The heating sources 25 may be selected from not only the halogen lamps but also carbon heaters, ceramic heaters, etc. The separation member for separating the process chamber 1 and the heating chamber 2 is not limited to the crystal board and may be a transparent ceramic or the like.

The subject 10 is not particularly limited and may be selected from not only the power IC such as IGBT element and a ceramic substrate but also a resistor element, a condenser element, a printed circuit board, etc., if only it can be processed by heat in the hydrogen vacuum furnace. Furthermore, the kind of solder is not limited to the Pb-free solder.

The invention claimed is:

1. A heating furnace for heating a subject to be heated by radiation, comprising:
    a first chamber in which the subject will be placed, the first chamber including a first gas feed port configured to feed a first gas and a first gas exhaust port configured to exhaust the first gas;
    a second chamber placed adjacent to the first chamber and housing a heating source, and including a second gas feed port configured to feed a second gas and a second gas exhaust port configured to exhaust the second gas, the second gas being different from the first gas;
    a separation member for separating the first chamber and the second chamber and allowing a radiant ray from the heating source to pass through;
    a control section for changing atmospheric gas and atmospheric pressure in the first chamber and the second chamber by feeding the first gas into and out of the first chamber through the first feed port and the first exhaust port, respectively, and feeding the second gas into and out of the second chamber through the second feed port and the second exhaust port, respectively; and
    a gas sensing section provided in the second chamber or in an exhaust path to which gas is discharged from the second chamber to detect a concentration of the first gas in the second chamber or exhaust path, wherein:
    when the gas sensing section detects that the first gas is a predetermined concentration value or higher, the control section performs safety control to prevent the concentration of the first gas in the second chamber or the exhaust path from increasing, and
    the safety control includes stopping feeding of the first gas into the first chamber.

2. The heating furnace according to claim 1, wherein during a heating process of the subject, the control section controls the atmospheric gas and the atmospheric pressure in the first chamber and the second chamber so that the atmospheric pressure in the second chamber is higher than the atmospheric pressure in the first chamber.

3. The heating furnace according to claim 1, wherein when the subject in the first chamber is subjected to a heating process using the heating source in the second chamber, the control section performs control to feed inert gas into the second chamber through the feed port and discharge the inert gas out of the second chamber through the exhaust port, to form a flow of inert gas going from the feed port of the second chamber toward the exhaust port of the second chamber.

4. The heating furnace according to claim 1, further comprising:
    a first pressure gauge for detecting atmospheric pressure in the first chamber; and
    a second pressure gauge for detecting atmospheric pressure in the second chamber,
    wherein the control section controls the atmospheric pressure of the first chamber and the atmospheric pressure of the second chamber based on a measurement result of the first pressure gauge and a measurement result of the second pressure gauge so that, during the heating processing of the subject, the atmospheric pressure in the second chamber is higher than the atmospheric pressure in the first chamber and a pressure difference between the atmospheric pressure in the first chamber and the atmospheric pressure in the second chamber is a predetermined value or lower.

5. A heating furnace for heating a subject to be heated by radiation, comprising:
    a first chamber in which the subject will be placed, the first chamber including a first gas feed port configured to feed a first gas and a first gas exhaust port configured to exhaust the first gas;
    a second chamber placed adjacent to the first chamber and housing a heating source, and including a second gas feed port configured to feed a second gas and a second gas exhaust port configured to exhaust the second gas, the second gas being different from the first gas;
    a separation member for separating the first chamber and the second chamber and allowing a radiant ray from the heating source to pass through;
    a control section for changing atmospheric gas and atmospheric pressure in the first chamber and the second chamber by feeding the first gas into and out of the first chamber through the first feed port and the first exhaust port, respectively, and feeding the second gas into and out of the second chamber through the second feed port and the second exhaust port, respectively; and
    a gas sensing section provided in the second chamber or in an exhaust path to which gas is discharged from the second chamber to detect a concentration of the first gas in the second chamber or exhaust path, wherein:
    when the gas sensing section detects that the first gas is a predetermined concentration value or higher, the control section performs safety control to prevent the concentration of the first gas in the second chamber or the exhaust path from increasing, and
    the safety control includes increasing a flow velocity of inert gas into the second chamber.

6. The heating furnace according to claim 5, wherein during a heating process of the subject, the control section controls the atmospheric gas and the atmospheric pressure in the first chamber and the second chamber so that the atmospheric pressure in the second chamber is higher than the atmospheric pressure in the first chamber.

7. The heating furnace according to claim 5, wherein when the subject in the first chamber is subjected to a heating process using the heating source in the second chamber, the control section performs control to feed inert gas into the second chamber through the feed port and discharge the inert gas out of the second chamber through the exhaust port, to form a flow of inert gas going from the feed port of the second chamber toward the exhaust port of the second chamber.

8. The heating furnace according to claim 5, further comprising:
- a first pressure gauge for detecting atmospheric pressure in the first chamber; and
- a second pressure gauge for detecting atmospheric pressure in the second chamber,
- wherein the control section controls the atmospheric pressure of the first chamber and the atmospheric pressure of the second chamber based on a measurement result of the first pressure gauge and a measurement result of the second pressure gauge so that, during the heating processing of the subject, the atmospheric pressure in the second chamber is higher than the atmospheric pressure in the first chamber and a pressure difference between the atmospheric pressure in the first chamber and the atmospheric pressure in the second chamber is a predetermined value or lower.

9. A heating method employed by a heating furnace for heating a subject to be heated by radiation, the heating furnace comprising a first chamber for accommodating the subject to be heated, a second chamber placed adjacent to the first chamber and housing a heating source, and a separation member for separating the first chamber and the second chamber and allowing a radiant ray from the heating source to pass through, the method comprising:
- a preparation step before delivering the subject to be heated into the first chamber, the preparation step including replacing inside of the second chamber with an inert gas atmosphere and then increasing atmospheric pressure in the second chamber greater than outside atmospheric pressure;
- an evacuation step after delivering the subject to be heated into the first chamber, the evacuation step including evacuating the first chamber to reduce the atmosphere thereof to a predetermined pressure; and
- a heating step after the first chamber is evacuated, the heating step including heating the subject to a predetermined temperature.

10. The heating method employed by the heating furnace, according to claim 9, the method comprising a blowing control step of keeping the second chamber at a predetermined atmospheric pressure and forming a flow of inert gas going from a feed port of the second chamber toward an exhaust port of the second chamber.

11. The heating method employed by the heating furnace, according to claim 9, comprising a pressure difference control step of controlling the atmospheric pressure in each of the first chamber and the second chamber in sync with variations in atmospheric pressure in the first chamber so that the atmospheric pressure in the second chamber is higher than the atmospheric pressure in the first chamber and a pressure difference between the atmospheric pressure in the first chamber and the atmospheric pressure in the second chamber is a predetermined value or lower.

12. The heating method employed by the heating furnace, according to claim 9, further comprising a safety control step of preventing a content of a first gas in the second chamber from increasing when the content of the first gas is detected to be a predetermined value or more by a gas sensing section provided in the second chamber or in an exhaust path to which the gas is discharged from the second chamber to detect the content of the first gas to be fed into the first chamber in the exhaust path.

* * * * *